Nov. 25, 1969    M. TUCHMAN    3,480,095
AXLE LOADING INDICATOR
Filed Nov. 29, 1967
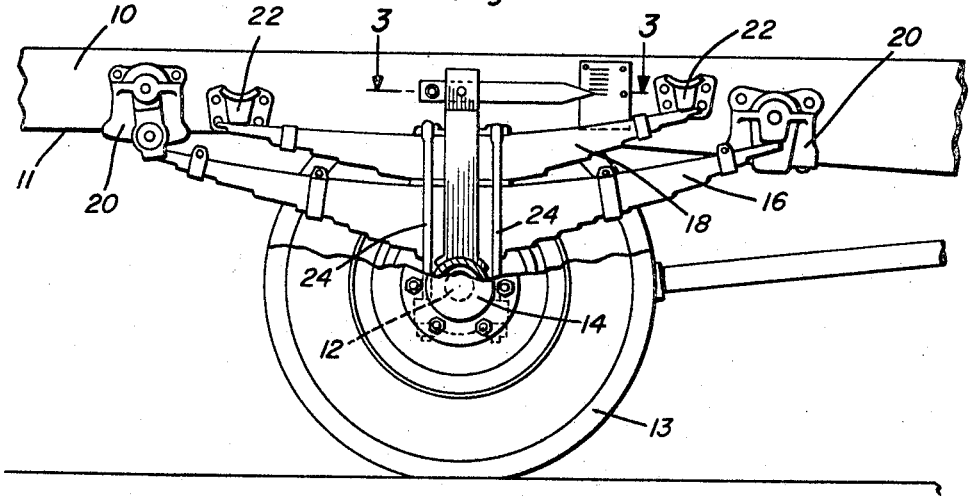
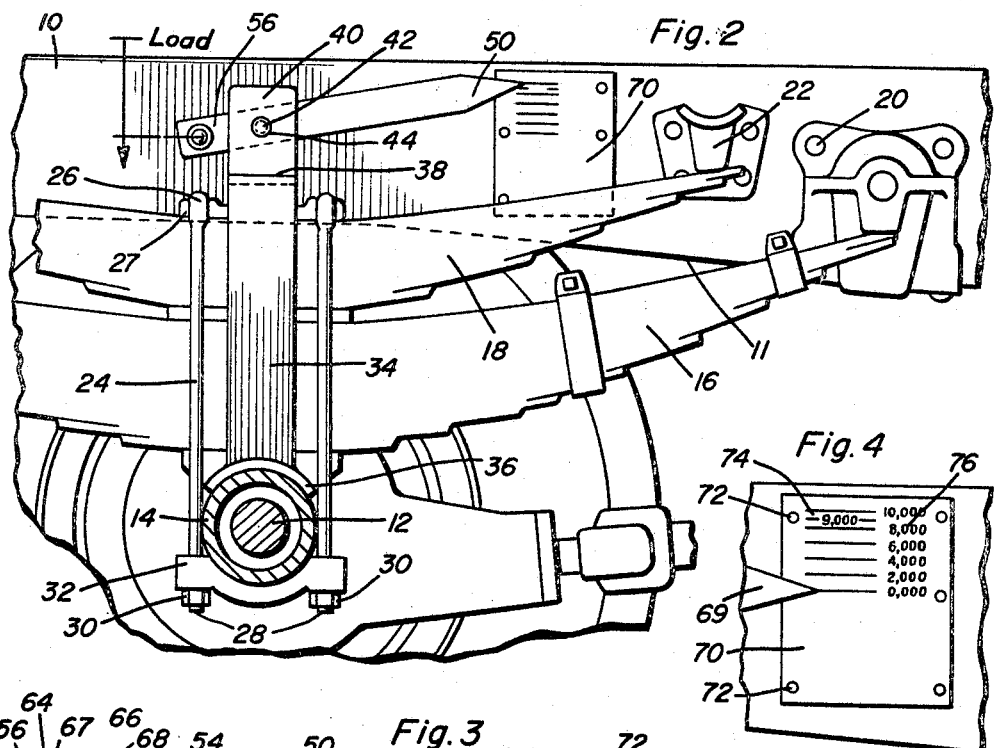
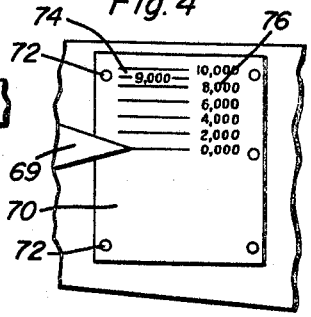
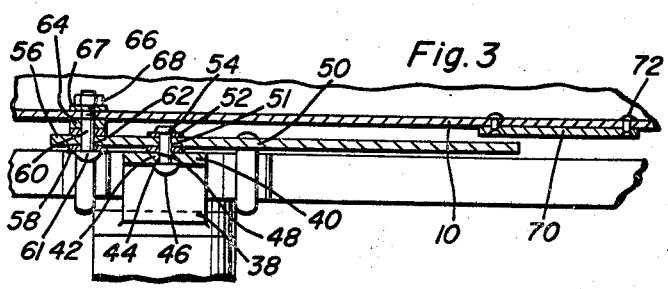
Martin Tuchman
INVENTOR.
BY Clarence A. O'Brien
and Harvey B. Jacobson
Attorneys United States Patent Office 3,480,095
Patented Nov. 25, 1969

3,480,095
AXLE LOADING INDICATOR
Martin Tuchman, Maplewood, N.J., assignor to Railway Express Agency, Incorporated, a corporation of Delaware
Filed Nov. 29, 1967, Ser. No. 686,496
Int. Cl. G01g 19/08
U.S. Cl. 177—137                             3 Claims

ABSTRACT OF THE DISCLOSURE

A load indicator for vehicles including an upright link, one end of which is seated upon an axle housing of a vehicle. The opposite end of the link is orientated vertically above the axle housing and is connected to a second link, the latter serving as a weight indicating pointer. One end of this pointer is fixed to the subframe of a vehicle by means of a rotating pin connection. The opposite end of the ponter rotates alongside a graduated plate or card which indicates the displacement of the subframe with respect to the axle housing, a measure of the load carried by the vehicle.

---

The field of the present invention relates to a load indicator for vehicles and more specifically to a mechanical linkage train which is displaced in accordance with the load being applied to a resiliently suspended frame.

The prior art includes weighing devices for vehicles incorporating mechanical linkage trains which employ different pivotal points for finally establishing a measure of the vertical displacement of a frame with respect to an axle housing, the displacement being dependent upon the ladening of the vehicle. Such prior constructions employing complicated linkage systems have been expensive to manufacture, and when installed, these constructions have required maintenance at frequent intervals due to the year and deterioration in the several pivot points.

In brief summary, the present invention includes a linkage bar containing an arcuate end portion which circumferentially engages the axle housing of a vehicle. The linkage bar is orientated vertically and perpendicular to the supporting base of a vehicle subframe. The upwardly disposed end portion of the linkage bar is pivotally connected to an intermediate length of an indicator link. One remote end of the indicator link is rotatably fixed to the subframe and the oppositely remote end of the indicator link is fashioned in a pointer shape. A graduated plate or card is fastened to the side edge of the subframe and positioned immediately behind the pointed portion of the indicator. In operation on a resiliently suspended frame, the indicator will indicate the vertical displacement between the supporting base of the subframe and the axle housing. This displacement is proportional to the load placed upon the subframe of the vehicle. Therefore, in essence the present construction includes a simple linkage train composed of two links operating relative to one another about two pivotal points. The simplicity of the present construction becomes manifest by the reduction in the necessity of maintenance and replacement of parts thereof. Accordingly, among the salient objects of the present invention are to provide:

A simple linkage unit for indicating the axle load of a vehicle;

A linkage train operable with a minimum number of pivotal points;

A vehicle load indicator which is substantially maintenance free;

A vehicle load indicator which is inexpensive to fabricate and install as well as being capable of performing satisfactorily in a heavy vibration environment.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary side elevational view illustrating the mounting of the present load indicator. The view includes a cutaway portion of the wheel nearer the observer.

FIGURE 2 is an exploded view as illustrated in FIGURE 1.

FIGURE 3 is a fragmentary sectional view taken along the plane passing through section line 3—3 of FIGURE 1.

FIGURE 4 is a front elevational view of a load indicating pointer and weight graduated plate.

Referring to the drawings in the preferred embodiment of the invention, subframe 10 and cross members 11 define the lower support base for a vehicle body, the subframe disposed parallel with and above a wheel axle 12 encased within an axle housing 14. A main leaf spring assembly 16 utilized in conjunction with a helper spring assembly 18 suspended the subframe 10 from the axle housing 14 in a conventional manner. Hanger brackets 20 support the terminal ends of the main leaf spring assembly and abutment brackets 22 provide contact support for the helper leaf spring assembly. The hanger and abutment brackets are fastened to the side edge of the subframe 10 in a symmetrical manner about a vertical line through a corresponding wheel center. A pair of U-bolts 24 are symmetrically supported from the upper surface of a median length of the helper lead assembly in a conventional manner. The upwardly disposed portion of the U-bolts include the respective bight sections 26 which are positioned to line within arcuate recesses formed within a bearing plate 27 positioned between the bight portions of the U-bolts 24 on the upward surface of the helper leaf spring assembly. Each of the U-bolts 24 are orientated to open downwardly so that each arm end of each U-bolt extends below the axle housing 14 and terminates in a threaded end portion 28. An arcuately curved collar 32 below the axle housing 14 is positioned over the threaded end portion of corresponding laterally disposed arms and secured by nut fasteners 30. The contour of the collar is adapted to conform with the correspondingly engaged cyclindrical surface of the axle housing 14. It is to be appreciated that the foregoing structural description represents a conventional resiliently suspended vehicle subframe which is utilized in vehicle constructions such as a tractor trailer or truck. The present invention is employed to cooperate with such a conventional frame and suspension design.

A linkage bar 34 is disposed perpendicularly to a subframe cross member 11 and extends between the top surface of the axle housing 14 and a side edge of the subframe 10. The lower end of link bar 34 terminates in an integrally connected arcuate bearing plate 36 of a diameter substantially equal to that of the axle housing 14 so that the contour of arcuate bearing plate 36 conforms to the contour of axle housing 14. The main vertical length of link bar 34 is vertically positioned between U-bolts 24 and is laterally positioned between the plane of the side edge of subframe 10 and a plane defined by the inwardly facing side of a correspondingly positioned tire 13.

The upper portion 38 of link bar 34 includes an offset flange portion 40 which is oriented parallel with the side edge of subframe 10 and in spaced relation thereto. An aperture 42 is formed within the central portion of offset flange 40 and receives therethrough a headed bolt 44 or other suitable fastener including a headed portion 46 shown in FIGURE 3 to abut the outwardly facing surface of offset flange 40. The opposite end portion of the bolt 44 passes through a generally rectangular linkage member 50 fabricated from a suitable material, the purpose of which is to be explained hereinafter. A washer member 48 is positioned concentrically about the shaft portion of bolt 44 and sandwiched between the outward surface of indicator linkage 50 and the inwardly confronting edge of offset portion 40. A second washer 52 similar to the first is positioned concentrically with the shaft portion of bolt 44 and is disposed in overlying relation with the inwardly facing surface of indicator linkage 50. A suitable termination fastener 54 is attached to the inwardly facing end of bolt 44 to secure same within the correspondingly aligned apertures 42 in the offset flange 40 and the aperture formed within indicator linkage 50.

As seen in FIGURE 2, the left end portion 56 of the indicator linkage 50 terminates in an edge which is in general vertical alignment with the left U-shaped bolt 24. This end portion 56 includes an aperture 58 formed therein for receiving a headed bolt 60, the latter including a head portion 61 abutting a washer 62 which in turn abuts the outwardly disposed surface of indicator linkage 50. A second washer 64 is positioned concentrically about the shaft portion of bolt 60 adjacent the inwardly facing surface of the indicator linkage 50, the aforementioned washer structure being sandwiched between the inwardly facing surface of linkage 50 and the outwardly confronting surface of subframe 10. The end portion of bolt 60 opposite the headed portion 61 passes through an aperture 66 formed within the ssubframe 10, this aperture being formed in horizontal alignment with the aperture 58 formed in the indicator linkage 50. A washer member 67 is positioned concentrically around the end portion of the bolt in overlying relation with the inwardly facing surface of subframe 10. This end portion of the bolt 60 is characterized by the threaded portion which receives a nut member 68, the latter being screwed upon the threaded portion of the bolt until contact is made with the washer 67 whereby a fixed point of indicator linkage rotation is established.

The opposite end of the indicator link 50 is formed in the shape of a pointer 69. A graduated plate or card 70 fabricated from metal, plastic or the like is positioned behind pointer end 69 and is fastened or attached to the side edge of subframe 10 in parallel spaced relation from the indicator linkage 50. Suitable fasteners 72 being rivets, screws or the like firmly affix the graduated plate 70. The plate is characterized by graduation marks 74 which are printed, engraved or the like on the plate and disposed within an area of the plate which is traversed by the pointer during operation of the device. Numerical indicia 76 are positioned alongside their respective graduating lines thereby indicating the numerical value for each mark.

In actual operation of a loaded vehicle, the subframe becomes vertically displaced with respect to the axis of the vehicle to a degree dependent upon the weight of the load. Accordingly, the present invention indicates this displacement by virtue of a pivotal displacement of one end of the indicator member with respect to the second end. Therefore, an angular rotation of the indicator is developed which is proportional to the vertical displacement of the subframe 10 with respect to the axle housing 14. The graduated plate 70 is calibrated to correlate this angular rotation with the load on the vehicle.

While the foregoing explanation has utilized the constructural design of a conventional truck vehicle, it is appreciated that the present invention may operate successfully with a vehicle utilizing spring assemblies below the axle of the vehicle. Further, it will be appreciated that the present invention works equally well with a vehicle using other forms of suspension such as air, rubber, hydraulics or the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. In a vehicle characterized by a yieldable suspension assembly interconnecting a load supporting base and an axle housing, a load indicating device comprising a pivotal mount connected to the supporting base, a vertical link supported at the lower end thereof by said axle housing, a horizontal indicator member pivotally connected at a first end portion thereof to said pivotal mount, said indicator being pivotally connected at an intermediate point thereof to the upper end portion of the vertical link, a graduated plate fastened to the vehicle supporting base in underlying spaced relation to the free end of the indicator member for measuring the angular displacement of the indicator member relative to the supporting base, said displacement being a function of the load exerted on the base.

2. The device set forth in claim 1 wherein the vertical link terminates at the lower end thereof in an integrally connected cylindrical bearing plate.

3. The device set forth in claim 1 wherein the graduated plate includes indicia lines imprinted thereon and calibrated to represent the weight of the load supported by said base.

References Cited

UNITED STATES PATENTS

| | | | |
|---|---|---|---|
| 243,150 | 6/1881 | Minck | 177—137 |
| 748,067 | 12/1903 | Hacker | 177—137 |
| 1,225,094 | 5/1917 | Wollensak | 177—137 |
| 2,106,652 | 1/1938 | Pinson | 177—137 |

ROBERT S. WARD, JR., Primary Examiner